United States Patent Office 3,563,950
Patented Feb. 16, 1971

3,563,950
LINEAR POLYBENZOXAZOLES
Henry W. Steinmann, Sparta, and Edward T. Pollard, Middlesex, N.J., assignors to Celanese Corporation, New York, N.Y., a corporation of Delaware
No Drawing. Filed July 9, 1969, Ser. No. 840,464
Int. Cl. C08g 33/04
U.S. Cl. 260—47       12 Claims

ABSTRACT OF THE DISCLOSURE

Aromatic and nonaromatic diacyl halides are reacted with 1,1-bis(3-amino-4-hydroxyphenyl) cyclohexane to produce linear polyamides which are transformed by thermal treatment into linear polybenzoxazoles comprising recurring units of the following formula:

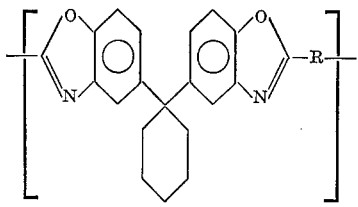

wherein R is a covalent bond, an alkylene substituent containing between about 1 and about 2 0 carbon atoms, or an arylene substituent containing between 6 and about 20 carbon atoms.

---

This invention relates to novel polybenzoxazoles, particularly, high molecular weight, linear polybenzoxazoles.

It is known that polymers such as polybenzimidazoles and polybenzoxazoles are tough, wear-resistant materials, having high softening temperatures, low water absorptivity, and good weatherability. Polybenzoxazoles of the type described in U.S. Letters Patent No. 2,904,537 issued to Brinker et al., Sept. 15, 1959 and U.S. Letters Patent No. 3,230,196 issued to Mayer, Jan. 18, 1966, are illustrative of polymers that exhibit good physical and chemical properties. However, linear polybenzoxazoles heretofore known have lacked satisfactory fiber properties. Unlike linear polybenzimidazoles, whose imidazole moieties have substantial intermolecular hydrogen bonding (and hence good fiber properties), the polybenzoxazoles heretofore known do not enjoy this type of intermolecular bonding. This is presumably due to the fact that polybenzoxazoles do not have protons bound to electronegative atoms as do the polybenzimidazoles. Unless there exists in the polybenzoxazole structure means for bringing about the necessary interaction between adjacent molecular chains, the fiber and film properties of the polybenzoxazole will be unsatisfactory.

Therefore, it is an object of the present invention to provide novel polybenzoxazoles of improved physical and chemical properties.

Another object is to provide novel, high molecular weight, linear polybenzoxazoles of enhanced fiber and film properties.

Yet another object of the present invention is to provide a process for producing novel, high molecular weight, linear polybenzoxazoles of enhanced fiber and film properties from readily available starting materials.

These and other objects as well as a fuller understanding of the present invention and its advantages can be had by reference to the following detailed description and claims.

Broadly, the above objects are achieved according to the present invention by reacting diacyl halides having the formula:

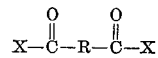

wherein X is a halogen substituent and R is a covalent bond, an alkylene substituent containing between 1 and about 20 carbon atoms, or an arylene substituent containing between 6 and about 20 carbon atoms, with 1,1-bis(3-amino-4-hydroxyphenyl) cyclohexane to produce novel linear polyamides (hereinafter sometimes called "polyamides") comprising recurring structural units of the formula:

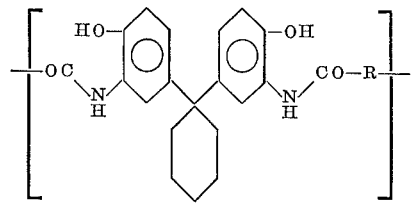

These linear polyamides are then caused to undergo intramolecular cyclization by heating at elevated temperature to produce novel linear polybenzoxazoles comprising recurring units of the formula:

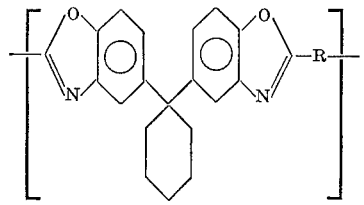

The reaction of the above-mentioned diacyl halides with 1,1-bis(3-amino-4-hydroxyphenyl) cyclohexane (hereinafter sometimes called "diamine") and subsequent cyclization of the intermediate polyamides to produce the linear polybenzoxazoles of the present invention are shown in the following equations:

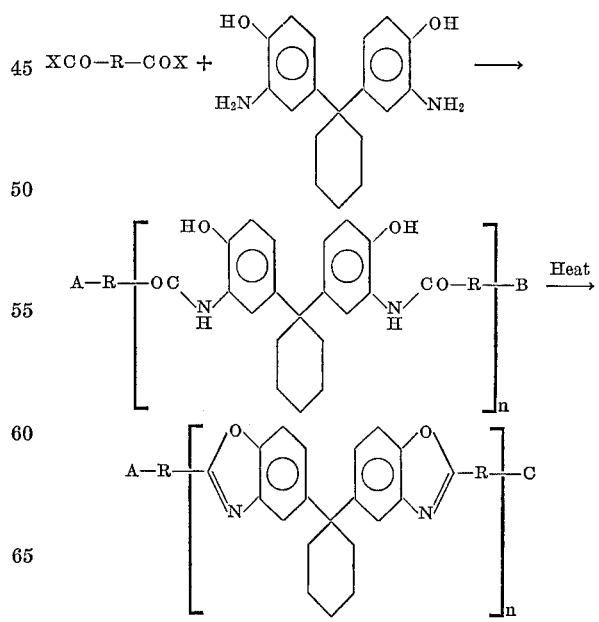

wherein $n$ is a positive integer representing the degree of polymerization: increasing degrees of polymerization (or increasing molecular weights) are reflected in higher values of $n$, and vice versa. A and B are each independently —COOH (or —COX in cases where the material has not been contacted with water) or

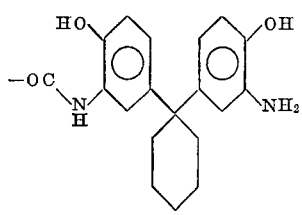

C can be either —COOH or

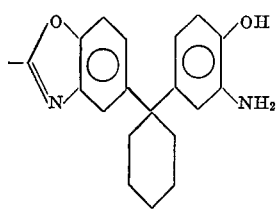

When the diacyl halide and diamine are combined in stoichiometrically equivalent amounts, the end-groups, A and B, will generally be different and the polyamide and polybenzoxazole will generally have the following respective formulae:

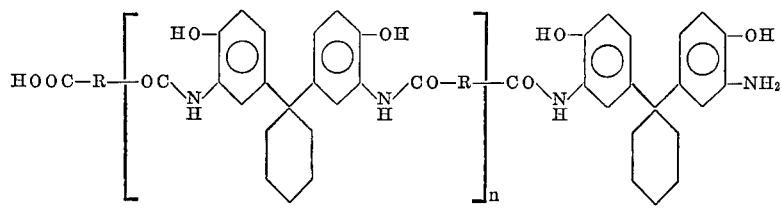
Polyamide

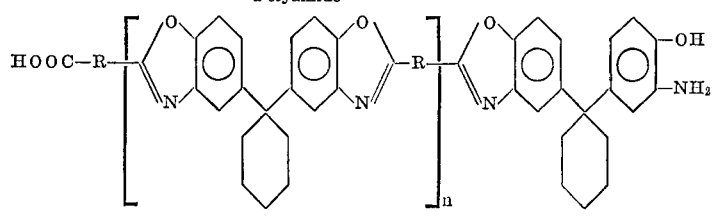
Polybenzoxazole

When the diacyl halide is employed in a stoichiometric excess or stoichiometric deficiency relative to the diamine, the polyamide and polybenzoxazole produced will generally have the following formulae:

(A) EXCESS DIACYL HALIDE

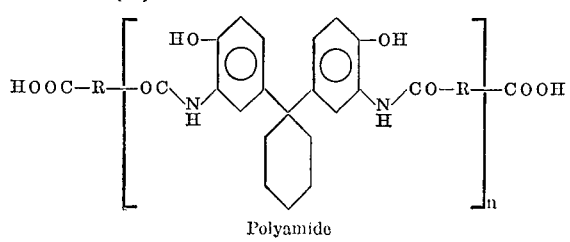
Polyamide

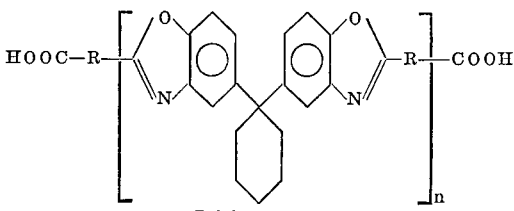
Polybenzoxazole or (B) EXCESS DIAMINE

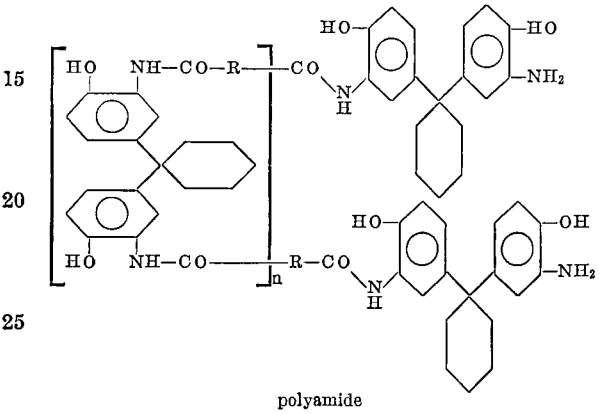
polyamide

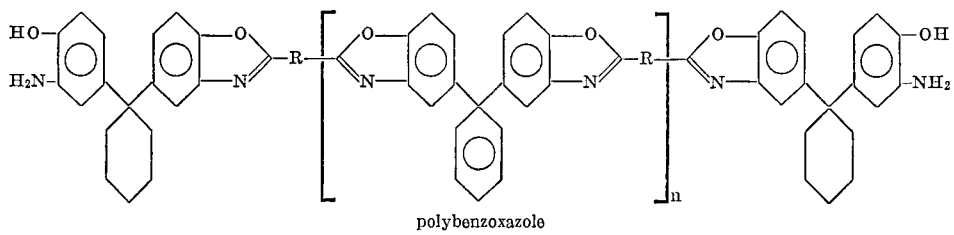
polybenzoxazole

The diamine, i.e., 1,1-bis(3-amino-4-hydroxyphenyl) cyclohexane, is prepared by first nitrating the readily available 1,1-bis(4-hydroxyphenyl)cyclohexane. The resulting novel nitrated product, i.e., 1,1-bis(3-nitro-4-hydroxyphenyl)cyclohexane is then conveniently reduced to the corresponding diamine by the method disclosed in U.S. patent application Ser. No. 840,465 of Henry W. Steinmann et al. (based on RFPA No. 3370C), the subject matter of which is made a part of the disclosure herein.

Diacyl halides suitable for use in preparing the novel polybenzoxazoles of the present invention are represented by the following formula:

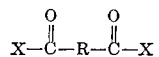

wherein —X is a halogen substituent, i.e., —F, —Cl, —Br, and —I. It is preferred that X be the same on both ends of the diacyl halide, and it is especially preferred to use diacyl chlorides because of the relative ease of handling and desirable level of reactivity thereof. R is a covalent bond, an alkylene substituent containing between 1 and about 20 carbon atoms, or an arylene substituent containing between 6 and about 20 carbon atoms. Suitable alkylene substituents include saturated and unsaturated (i.e., containing olefinic and/or acetylenic linkages), and unsubstituted and substituted (i.e., containing pendant and interposed acyclic, aromatic and nonaromatic, carbocyclic, aromatic and nonaromatic heterocyclic, ketonic, ether, carbalkoxy, and sulfonyl) alkylene substituents. Examples of suitable alkylene substituents include methylene, hexamethylene, 1,4 - cyclohexylene, 1,4 - bis (methylene)cyclohexane, and 1,5-decahydronaphthylene. Suitable arylene substituents include unsubstituted and substituted (i.e., containing pendant and interposed acyclic, aromatic and nonaromatic carbocyclic, aromatic and nonaromatic heterocyclic, ketonic, ether, carbalkoxy, and sulfonyl) arylene substituents. Examples of suitable arylene substituents include meta-phenylene, para-phenylene, 4,4' - biphenylene, bis(para - phenylene)sulfone, bis (para-phenylene)ether, and 1,5-naphthylene.

The reaction between diacyl halides of the type described above with 1,1-bis(4-hydroxy-3-aminophenyl) cyclohexane is advantageously (although not necessarily) conducted in the manner disclosed in U.S. patent application Ser. No. 840,248 of H. W. Steinmann et al. (based on RFPA No. 3465C). The subject matter of said copending application is made a part of the disclosure herein.

The intramolecular cyclization of the novel polyamides described hereinabove to form the polybenzoxazoles of the present invention is accomplished by heating the polyamide at a temperature of between about 300° C. and about 400° C. and preferably between about 325° C. and about 375° C. to effect condensation between the amide carbonyl moieties and the adjacent hydroxy substituents. The time required for complete cyclization can vary, depending on the structure of the particular polyamide being cyclized. Complete cyclization is conveniently determined by noting the disappearance of the amide carbonyl infrared absorption peak (about 6.05 microns) and the appearance of an absorption peak corresponding to the benzoxazole moiety at about 6.45 microns. Generally, a period of time of between about 2 hours and about 6 hours in air or preferably in an inert atmosphere (e.g., argon, nitrogen) at the aforementioned cyclization temperatures is sufficient. Instead of the use of an inert atmosphere, the heating can be conducted in vacuo. The cyclization step can be performed in a variety of ways to produce the polybenzoxazole in any particular form desired. Thus, a solution of the polyamide in a suitable condensation-promoting solvent (e.g., N,N-dimethylacetamide, N-methylpyrrolidone, dimethyl sulfoxide, hexamethylphosphoramide, and the like) can be heated at the required temperature to effect cyclization and simultaneous evaporation of the solvent, if desired. A particularly useful variant of this procedure involves applying the aforementioned polyamide solution onto a surface and then heating or baking the surface at the required cyclization temperature. In this way, the solvent is driven off, leaving a film or coating of the resultant polybenzoxazole on the surface. Alternatively, a solution or "dope" of the polyamide suitable for spinning the polyamide into fibers or forming same into films can be prepared and subsequently processed, in a conventional manner, into said fibers or films. These can then be heated at the required cyclization temperatures, resulting in the transformation of the polyamide fibers or films into fibers or films of polybenzoxazole.

It is a feature of the present invention that the aforementioned methods of transforming the polyamide into fibers and films of polybenzoxazole are greatly facilitated by the unique structure of the polyamide. In particular, the presence on the chain of a rather bulky hydrocarbon substituent in the form of a cyclohexane substituent appears, unexpectedly, to enhance the solubility of the polyamide in condensation-promoting, "dope-forming" solvents of the type including, e.g., N,N-dimethylacetamide, N-methylpyrrolidone, dimethylsulfoxide, hexamethylphosphoramide, and the like. Good solubility characteristics of the instant polyamides are important insofar as the polybenzoxazoles formed therefrom are of very low solubility in common solvents of the type mentioned above.

Without wishing to be bound by theory, it is believed that the enhanced fiber and film properties of the polybenzoxazoles of the present invention are due to the steric effect of the cyclohexyl moiety. Specifically, the cyclohexyl moieties are believed to protrude from the bulk of the polymer chain and thereby tend to prevent the slippage of one polymer molecule past another. Hence, the introduction of pendant cyclohexyl moieties accomplishes the same beneficial result in the polybenzoxazoles of the present invention as does intermolecular hydrogen bonding in polybenzimidazoles.

The present invention is further illustrated (but not limited) by the following examples.

EXAMPLE 1

Polybenzoxazole from 1,1-bis(3-amino-4-hydroxyphenyl) cyclohexane and isophthaloyl chloride (a) Preparation of 1,1-bis(3-nitro-4-hydroxyphenyl) cyclohexane.—To a stirred suspension of 1,1-bis(4-hydroxyphenyl)cyclohexane in glacial acetic acid at 15° C. is added a stoichiometric amount of concentrated nitric acid over a period of two hours. The temperature is maintained at 15° C. throughout the addition. When all of the nitric acid has been added, the resultant solution is allowed to stand at 15° C. for one hour. At the end of that time, the reaction mixture is poured into iced water, whereupon the product precipitates. This aqueous precipitate is allowed to stand in situ for about 18 hours and is then collected by filtration and washed thoroughly with water. The damp, caked product is immediately dissolved in hot iso-propanol, followed by the addition thereto of 1 volume of water for every 2 volumes of iso-propanol used. The solution is heated to boiling and treated with decolorizing carbon, followed by filtration through a "fluted" filter. Upon allowing the filtrate to stand for several hours at room temperature, the product separates therefrom as yellow rhombic crystals which are collected by filtration and dried in vacuo at 60° C. These crystals have M.P. 112° C. The product is identified as 1,1 - bis(3 - nitro - 4 - hydroxyphenyl)cyclohexane by elemental analysis.

Analysis.—Calc'd for $C_{18}H_{18}N_2O_6$ (percent): C, 60.3; H, 508; N, 7.82; O, 26.8. Found (percent): C, 60.3; H, 5.04; N, 7.62; O, 26.9.

(b) Preparation of 1,1-bis(3-amino-4-hydroxyphenyl) cyclohexane.—To a solution of 40.0 grams (1.00 moles) of sodium hydroxide in 1800 milliliters of water are added 21.48 grams (0.06 mole) of 1,1-bis(3-nitro-4-hydroxyphenyl)cyclohexane (prepared in the manner described in (a), above). To the resultant red-colored solution is rapidly added a solution of 210 grams (1.0 mole) of sodium hydrosulfite ($Na_2S_2O_4 \cdot H_2O$) in 1800 milliliters of water with stirring. The reaction mixture becomes almost colorless within about 10 to 15 minutes. A volume of 35 milliliters 4 N hydrochloric acid is slowly added to the reaction mixture to precipitate the 1,1-bis(3-amino-4-hydroxyphenyl)cyclohexane as a white, flocculent solid. The pH of the supernatent liquid is about 7.2; all of these manipulations can be conducted under oxygen-free conditions, although such is not necessary if an excess of sodium hydrosulfite has been used. The precipitate is collected, preferably under an atmosphere of nitrogen, and washed thoroughly with deoxygenated water. It is then dissolved in 540 milliliters of deoxygenated 0.31 N hydrochloric acid. About 5 grams of decolorizing carbon are added and a stream of nitrogen is bubbled through the black suspension for about 30 minutes to expel any hydrogen sulfide and sulfur dioxide from the system. The suspension is filtered in an atmosphere of nitrogen to remove suspended solids. This filtrate can be used directly in reactions with diacyl halides to produce polyamide precursors to the polybenzoxazoles of the present invention as exemplified in part (c), hereinbelow.

(c) Preparation of the polyamide precursor to the polybenzoxazole.—The volume of the filtrate obtained in (b), above, is increased to 600 milliliters by the addition thereto of deoxygenated water.

A 10 milliliter portion (i.e., a 1/60 aliquot) of the solution is diluted to about 100 milliliters with distilled water and titrated with 0.1 N sodium hydroxide using a pH meter. The following readings are taken:

Milliliters of N/10 sodium
hydroxide added:
    0.0 _____ 2.21
    1.0 _____ 2.28
    3.0 _____ 2.42
    5.0 _____ 2.65
    7.0 _____ 3.04
    7.1 _____ 3.08
    7.2 _____ 3.10
    7.4 _____ 3.15
    7.5 _____ 3.18
    7.6 _____ 3.20
    7.7 _____ 3.21
    7.8 _____ 3.23
    8.0 _____ 3.29
    10.0 _____ 3.73
    12.0 _____ 4.08
    14.0 _____ 4.33
    16.0 _____ 4.60
    18.0 _____ 4.82
    20.0 _____ 4.15
    21.0 _____ 4.18
    22.0 _____ 4.22
    23.0 _____ 4.46
    23.5 _____ 4.85
    23.7 _____ 5.26
    23.9 _____ 6.25
    24.0 _____ 7.15

Computerized data from six other titration runs show that the inflection point occurs at a pH of 3.20. The corresponding volume of 7.6 milliliters of N/10 sodium hydroxide represents the amount of free hydrochloric acid in the solution. As additional sodium hydroxide is added, the dihydrochloride of the diamine monomer becomes neutralized. When about half the dihydrochloride is neutralized, the monomer precipitates from solution, accompanied by a sudden decrease in the pH over the range covered by 18.0 to 20.0 milliliters of N/10 sodium hydroxide. Thereafter, the neutralization is heterogeneous. When all the dihydrochloride is neutralized, the pH rises sharply to the endpoint pH of 7.0 at about 24.0 milliliters of N/10 sodium hydroxide. From these results, the amount of diamine dihydrochloride monomer is given as (24.0−7.6)×(0.1) milliequivalents=1.64 milliequivalents or 0.82 millimole. Since the aliquote is a 1/60 aliquot, then the original solution contains 60×0.82=49.2 millimoles or 0.0492 mole. Of course, when computing the amount of isophthaloyl chloride for use in the polymerization, it is necessary to take into account the aliquot that was removed.

The free hydrochloric acid in the original solution is next neutralized with a stoichiometric amount of sodium acetate. The solution is then placed in a Waring-type or other suitable high-shear blender together with a solution of 9.824 grams (0.0484 mole) of isophthaloyl chloride in about 300 milliliters of methylene chloride and the mixture agitated for 10 seconds in an atmosphere of nitrogen. A volume of 93 milliliters of 2.3 M sodium acetate solution is then added all at once, and agitation of the resultant thick reaction mixture is continued for an additional 10 minutes. The reaction mixture is added to methanol and the white, granular polyamide product is collected and washed thoroughly with water and methanol and then dried in vacuo at about 30° C. The yield of dried polyamide is 20.7 grams (100% of theory based on the diamine or terephthaloyl chloride). The infrared spectrum of the product shows a strong absorption band at 6.05 microns (corresponding to the amide carbonyl group). No absorption occurs at 5.85 microns (corresponding to an ester carbonyl group). The structure of the polyamide consists of recurring units having the following formula:

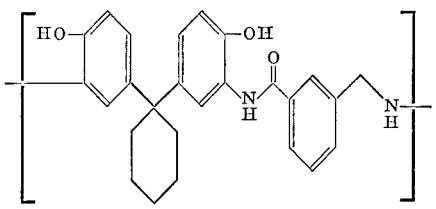

The polyamide is soluble in a variety of solvents, e.g., N,N-dimethylacetamide, N-methylpyrrolidone, dimethylsulfoxide, hexamethylphosphoramide, and the like. The inherent viscosity is consistently between 1.30 and 1.55 deciliters per gram as measured in a 0.1% by weight solution in N-methylpyrrolidone at 25° C. When the polymer is observed under a hot stage microscope, it exhibits a melting point of 285–300° C. Fibers and films are readily formed from solutions (i.e., "dopes") of the polymer in e.q., N,N-dimethylacetamide. The identity of the product is further supported by elemental analysis.

Analysis.—Calc'd for $C_{26}H_{24}N_2O_4$ (percent): C, 72.90; H, 5.65; N, 6.54; O, 14.91. Found (percent): C, 71.2; H, 5.03; N, 6.20; O, 16.0.

(d) Preparation of the polybenzoxazole.—A sample of the polyamide produced in (c), above, is heated at 350° C. for 5 hours at a pressure of 0.1 mm. Hg. During the process, the color of the material changes from white to tan.

The infrared spectrum of the product shows a strong absorption at 6.45 microns (corresponding to the benzoxazole moiety) and the absence of absorption at 6.05 microns (corresponding to the amide carbonyl moiety). Thermal gravimetric analysis in nitrogen and air indicates that the polybenzoxazole has excellent heat stability up to about 500° C. This desirable property is surprising in view of the saturated nature of the cyclohexane moiety, which would be expected to impair the thermal stability of the benzoxazole polymer.

EXAMPLE 2

Polybenzoxazole from 1,1-bis(3-amino-4-hydroxyphenyl) cyclohexane and terephthaloyl chloride In this example, the polyamide precursor is produced according to procedure described in parts (a) to (c) of Example 1, except that terephthaloyl chloride is substituted for isophthaloyl chloride. The structure of the polyamide consists of recurring units having the following formula,

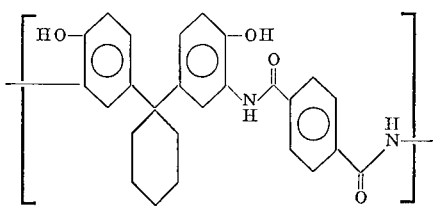

The infrared spectrum of this material shows a strong absorption at 6.05 microns and no absorption at 5.85 microns. The polymer has an inherent viscosity of 0.93 to 1.08 deciliters per gram as determined in a 0.1% by weight solution in N-methylpyrrolidone at 25° C. It does not melt below 380° C.

A "dope" of the polyamide in dimethylacetamide/LiCl is prepared by heating a solution of the polyamide in the latter with agitation at 70° C. There results a gel-free dope containing about 40% by weight solids and having a viscosity of about 2000 poises. The dope is spun into water, and the resulting white, porous filaments are washed, dried, and hand-drawn over a hot shoe at 280° C. Properties of the drawn polyamide filament are summarized in Table I, below:

TABLE I.—FIBER PROPERTIES OF THE POLYAMIDE FILAMENT

| Draw ratio | Denier per filament | Tenacity (g./den.) | Elongation (percent) | Initial modulus (g./den.) |
|---|---|---|---|---|
| Undrawn | 39.6 | 0.46 | 4.1 | 21 |
| 2.0 | 20.0 | 1.1 | 3.3 | 50 |
| 2.7 | 15.5 | 1.1 | 2.5 | 56 |
| 3.3 | 12.0 | 1.5 | 4.7 | 67 |
| 5.0 | 8.0 | 2.6 | 5.7 | 107 |

The polyamide which constitutes the above-prepared fiber is intramolecularly cyclized to the corresponding polybenzoxazole by heating the fiber in air up to 350° C. over a period of 2 hours and then maintaining this temperature for an additional hour. A comparison of the properties of the polybenzoxazole fiber thus produced and the corresponding properties of the precursor polyamide fiber are summarized in Table II, below:

TABLE II.—FIBER PROPERTIES BEFORE AND AFTER CYCLIZATION

| Fiber property | Drawn polyamide fiber | Cyclized fiber |
|---|---|---|
| Tenacity (g./denier) | 1.7 | 1.0 |
| Elongation (percent) | 4 | 4.9 |
| Initial modulus (g./denier) | 63 | 35 |

It is seen from the data of Table II that the fiber properties of the polybenzoxazole are almost as good as those of the polyamide precursor, which latter properties are per se not undesirable. The results of this comparison, together with the high degree of thermal stability of the polybenzoxazole demonstrate the overall high quality film and fiber properties of the polybenzoxazoles of the present invention.

What is claimed is:

1. A linear polyamide consisting essentially of recurring structural units of the following formula:

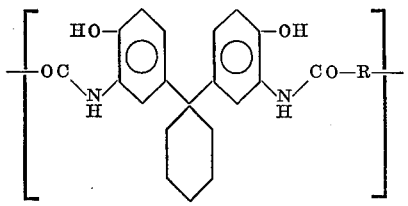

wherein R is a covalent bond, an alkylene radical containing between 1 and about 20 carbon atoms, or an arylene radical containing between 6 and about 20 carbon atoms.

2. A polyamide according to claim 1 wherein R is a covalent bond.

3. A polyamide according to claim 1 wherein R is an alkylene radical containing between 1 and about 20 carbon atoms.

4. A polyamide according to claim 3 wherein R is methylene, hexamethylene, 1,4 - cyclohexylene, 1,4-bis-(methylene)cyclohexane, or 1,5-decahydronaphthylene.

5. A polyamide according to claim 1 wherein R is an arylene radical containing between 6 and about 20 carbon atoms.

6. A polyamide according to claim 5 wherein R is meta phenylene, para-phenylene, 4,4'-biphenylene, bis-(para-phenylene)sulfone, bis(para-phenylene)ether, or 1,5-naphthylene.

7. A linear polybenzoxazole consisting essentially of recurring structural units of the following formula:

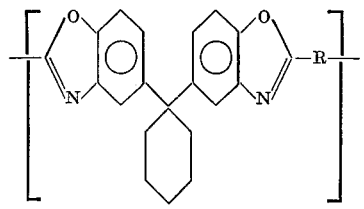

wherein R is a covalent bond, an alkylene radical containing between 1 and about 20 carbon atoms, or an arylene radical containing between 6 and about 20 carbon atoms.

8. A polybenzoxazole according to claim 7 wherein R is a covalent bond.

9. A polybenzoxazole according to claim 7 wherein R is an alkylene radical containing between 1 and about 20 carbon atoms.

10. A polybenzoxazole according to claim 9 wherein R is methylene, hexamethylene, 1,4-cyclohexylene, 1,4-bis-(methylene)cyclohexane, or 1,5-decahydronaphthylene.

11. A polybenzoxazole according to claim 7 wherein R is an arylene radical containing between 6 and about 20 carbon atoms.

12. A polybenzoxazole according to claim 11 wherein R is meta-phenylene, para-phenylene, 4,4'-biphenylene, bis(para-phenylene)sulfone, bis(para-phenylene)ether, or 1,5-naphthylene.

References Cited

UNITED STATES PATENTS 3,230,196   1/1966   Moyer _____ 260—47
3,332,907   7/1967   Angelo et al. _____ 260—47

WILLIAM H. SHORT, Primary Examiner

L. L. LEE, Assistant Examiner

U.S. Cl. X.R.

260—30.2, 30.6, 30.8, 32.4, 32.6, 78, 78.4, 571, 618